March 7, 1961 L. W. PARKER 2,974,313
MULTIPLE READING INSTRUMENTS AND SYSTEMS
FOR REMOTE INDICATION
Filed Sept. 18, 1958 3 Sheets-Sheet 3
Fig. 7.
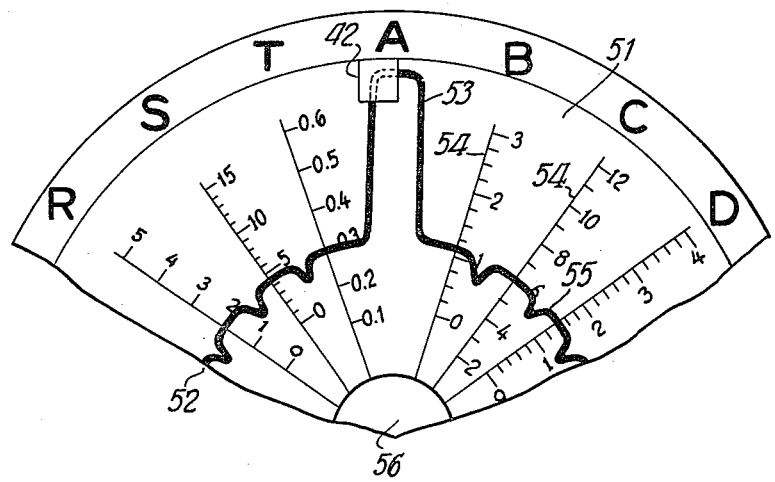
Fig. 8.
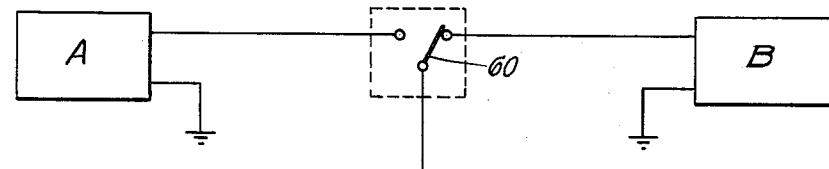
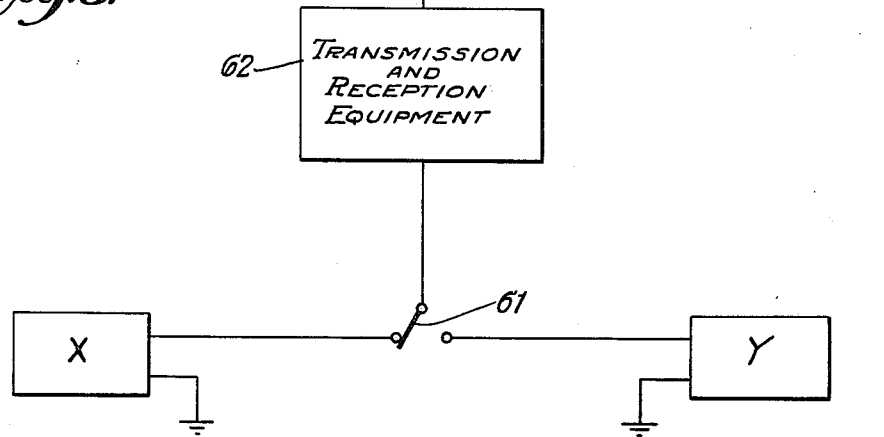
INVENTOR.
Louis W. Parker.
BY
Ward, Neal Haselton, Orme & McChannon
ATTORNEYS.

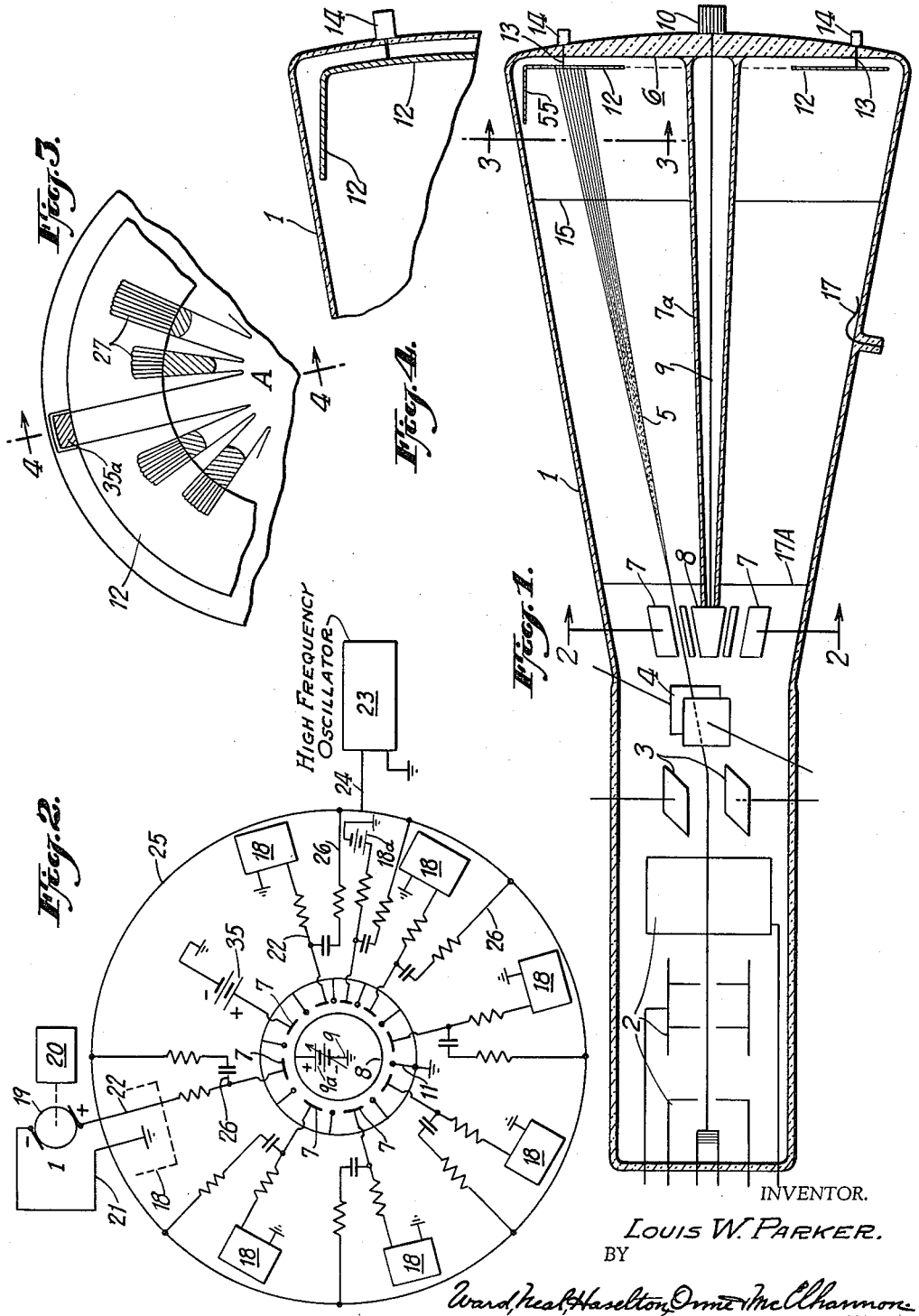

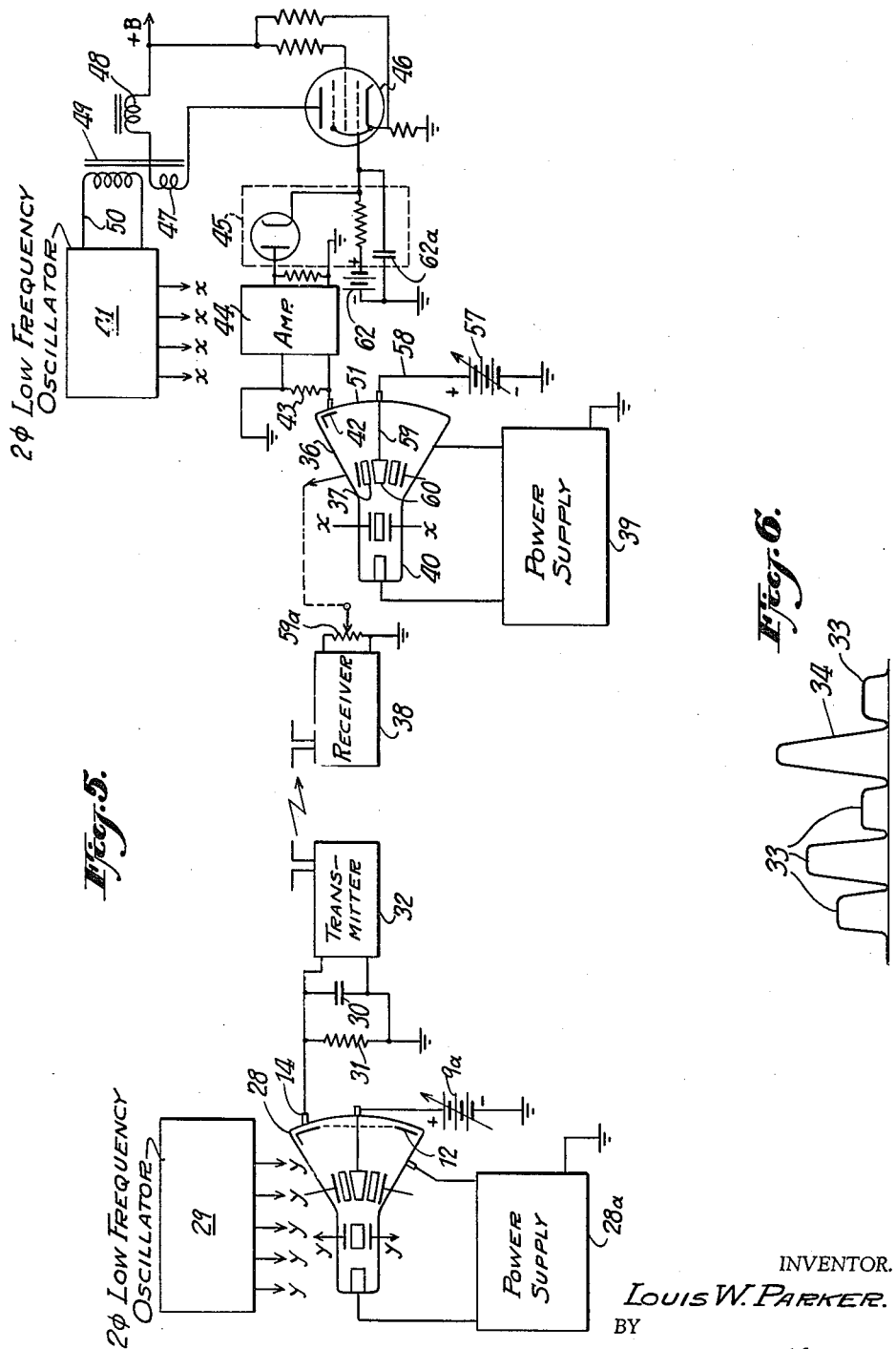

United States Patent Office 2,974,313
Patented Mar. 7, 1961

2,974,313

MULTIPLE READING INSTRUMENTS AND SYSTEMS FOR REMOTE INDICATION

Louis W. Parker, Beechcroft Road, Greenwich, Conn.

Filed Sept. 18, 1958, Ser. No. 761,863

11 Claims. (Cl. 340—183)

This invention pertains to cathode ray tubes of novel construction and operation and to electrical systems incorporating the same, for successively and repetitively indicating the magnitudes of a large number of electrical potentials or voltages subject to variation, and for recurrently and luminously, remotely displaying said magnitudes in substantially fixed angular spacing on the screen of such a tube provided with measuring indicia thereon.

In my copending application Serial No. 316,735, filed October 24, 1952, I have described a cathode ray tube instrument and system of this character which, however, is restricted as to use, substantially to the location of the voltages to be measured and for display thereat, such for example, as display on the instrument panel of a plane, of voltages corresponding to various components thereof to be measured, such as the amount of fuel in the tanks, engine speed, oil pressure, battery drain or charge, etc.

The present invention extends the fields of use of that of my application above mentioned by modification of the cathode ray instrumentalities such as to permit of remote indication and display of the voltages to be measured, as by wire or radio transmission between the points of measurement and display. To this end, the present invention provides modified types of cathode ray instruments for use at the measuring and display stations, respectively, the first for generating successive signals commensurate in magnitude with the voltages to be measured, and the second for receiving said signals and displaying them as aforesaid on the screen thereof.

The invention described in my earlier application consists essentially of a cathode ray tube (resembling such tubes as used in cathode ray oscilloscopes) in which the beam is made to describe a circle on the viewing screen. This may be done in any conventional manner as for example by applying a two-phase A.C. voltage of any suitable frequency to the deflection plates. The cathode ray tube used in the said invention, differs from conventional types in that in addition to the usual two pairs of deflection plates, there is also a large number of auxiliary deflection plates (for example, forty), located around a circle coaxial with the tube. Each of these auxiliary deflection plates is connected to a transducer applying a potential thereto, and in this way each of the auxiliary plates receives an electric potential the value of which is independent of any other deflecting potential. When the cathode ray beam passes adjacent to any given such auxiliary deflection plate, it is deflected by it radially by the potential in the transducer connected thereto. In this way the radius of the above-mentioned circle is altered for the comparatively narrow region of each auxiliary deflection plate, supplying thereby an indication of the magnitude of potential applied by any given transducer.

Referring now to the drawings for a more detailed description of the present invention:

Figure 1 is a schematic view in axial sectional elevation of a cathode ray tube according to the invention for use at the transmitting station of a system for remote display of the voltages to be measured.

Figure 2 is a schematic sectional elevation taken substantially at 2—2 of Fig. 1 with appurtenant electrical circuits shown diagrammatically.

Figure 3 is a fragmentary view in sectional elevation taken substantially at 3—3 of Fig. 1, showing the tube construction looking toward the screen and illustrative of the cathode ray beam pattern traced thereon when the tube is in operation.

Figure 4 is a fragmentary sectional view taken at 4—4 of Fig. 3, illustrative of a detail of the tube construction hereinafter described.

Figure 5 is a diagrammatic showing of a system including transmitting and receiving stations according to the invention for remotely displaying the voltages measured at the transmitting station.

Figure 6 is a graphical showing of a portion of the voltage measurement signals imposed on the transmitter at the transmitting station of Fig. 5, while Figure 7 shows correspondingly a portion of the transmitted signals as displayed on the cathode ray tube screen of the receiving station.

Figure 8 is a diagrammatic showing of a modification of the invention for remote display employing two pick-up units at the transmitting station and two display units at the receiving station, each of which is alternately switched back and forth to insure greater reliability of operation.

In the cathode ray tube instrumentality of Figs. 1 to 4, inclusive, the essential components and electrical circuit connections are as above stated, basically like that above described with reference to my prior application, except as modified, as hereinafter explained, for evaluating a plurality of voltages at a transmitting station and generating signals commensurate therewith for transmission to, and display on, a cathode ray tube screen at a remotely located receiving station. In these figures, element 1 represents the conventional glass or glass and metal hermetically sealed envelope or container, housing therein the gun structure of conventional construction shown by element 2, and the pairs of main deflecting plates 3 and 4, disposed at right angles to each other so that when energized from a two-phase alternating current source, the electron beam 5 is deflected in a circular trace onto the screen 6 of the tube. Mounted close to the main deflecting plates 3, 4 and between these plates and the screen 6, are a plurality of the above-mentioned auxiliary electrodes 7 which in end view are arranged in spaced circular relation about the tube axis as shown in Fig. 2, and are also disposed in inclined relation to the tube axis as shown in Fig. 1 in conformity with a substantially conical surface. Mounted coaxial with the tube on a drawn-in part 7a of the screen 6 and within the limiting confines of the auxiliary deflector plates 7, is a metal cone 8 connected by a conductor 9, to a grounding terminal 10 mounted on the exterior of the screen 6, which in turn is connected, as shown in Fig. 2, to ground through a battery 9a for applying a positive biasing potential to the cone as explained below, the purpose of this cone being to establish an electrostatic field between the thus grounded cone and the adjacent auxiliary deflection plates 7. Between the auxiliary deflection plates are interposed metal rods 11, grounded as shown in Fig. 2, in order to reduce interaction between the electrostatic fields established on the auxiliary deflector plates 7 by the potentials applied thereto. All of the elements thus far described are embodied in the cathode ray instrumentality of my prior application aforesaid.

In accordance with the present invention, however, there is added a washer-like metal ring or annulus 12 of sheet metal, such as aluminum, which is mounted adjacent the screen on the interior of the tube as shown in Fig. 1, this ring being connected over leads 13, sealed through the screen, to output terminals 14 mounted on the screen exterior. The purpose of ring 12 is to emit secondary electrons when bombarded by the electron beam 5. The secondary electrons so emitted are collected by the conductive coating 15 provided on the interior of the tube envelope 1. This conductive coating is positively charged with respect to ring 12.

In both the transmitting and receiving end the cathode of the CR tube is above ground while the accelerating electrode (plate) is grounded.

Referring to Fig. 2, the sources of voltage to be measured are connected to the auxiliary deflector plates 7, respectively, from transducers shown in block diagram form at 18. As illustrative of the application of such a potential or voltage source subject to variation, there is shown a tachometer 19, mounted on the shaft of an engine shown diagrammatically at 20. The tachometer generates a D.C. voltage proportional at the engine speed, the negative terminal of the tachometer being grounded over lead 21, and the positive terminal being connected over lead 22 to one of the auxiliary plates 7 to apply thereto a positive potential which varies in accordance with the engine speed. The remaining transducers 18 similarly include other voltage sources, subject to variation, to be measured, for correspondingly applying positive potentials to the various other auxiliary deflecting plates, such for example, as the voltage drop across a resistor in a battery lead for indicating charging or discharging rate, or a voltage indicative of oil pressure in the oil circulating system of an engine, or one representative of the amount of fuel in the gas tanks, etc., of a plane or the like.

In order to generate signals on the metal ring 12, which may be picked up on the output connection 14 for transmission to the remote point and which are representative of the various potentials to be telemetered, there is in addition to the D.C. potentials impressed by the transducers 18 onto the auxiliary plates 7, an A.C. potential of fairly high frequency, such for example as 50,000 cycles per second, applied thereto from an oscillator 23 and over connections 24, 25 and 26, each of the connections 26 containing as shown a resistance in series with the condenser. An additional resistance is contained in each connection 22 extending from a transducer 18 to its associated deflector plate 7. Inasmuch as the transducers may present a low impedance to the alternating current source 23, these resistors are interposed in the connections 22 and 26 for assuring a relatively high impedance between the transducers and the high frequency source and also for reasons of overall isolation.

If the frequency of oscillator 23 is sufficiently high, i.e., on the order above-mentioned, the pattern described on the screen of the cathode ray tube will appear as a two-dimensional area for each auxiliary deflection plate, as shown at 27 in Fig. 3. Part of each area 27 covers the metal ring 12, and the extent of this coverage depends both on the D.C. potential applied from the transducers 18 to the deflector plates 7, respectively, and also on the A.C. potential applied thereto from the oscillator 23. Since the A.C. potential thus applied is of substantially unvarying amplitude, the part of the areas 27 which overlap the ring 12 will be determined primarily by the D.C. potentials from the transducers. The greater the area covered by each pulse on ring 12, the greater will be the total secondary electrons emitted therefrom. It will be understood that these secondary electrons are not emitted continuously, but only during the intervals that the electron beam 5 impinges on the metal ring 12. However, since the direction of the flow of the secondary electrons is always the same, that is, away from the metal ring 12 and onto the conductive inner tube coating 15, a condenser can integrate the intermittent current flow thus generated to produce a signal proportional to the magnitude of the D.C. potential impressed on each of the auxiliary deflector plates 7.

As above noted, the metal cone 9 is positively biased with respect to ground by the adjustable D.C. biasing voltage 9a. The purpose of this is to so bias the electron beam 5 that the oscillogram produced thereby on the screen just touches the inner edge of the metal ring 12 when no potentials are impressed on the auxiliary plates 7 from the transducers 18.

Referring now to Fig. 5 which illustrates the method and apparatus according to the invention for picking up the signals generated on the ring 12 in the manner above explained, and for reproducing the same at a remote point, the cathode ray tube shown at 28, is constructed, connected and operated in accordance with that illustrated in Figs. 1 to 4, inclusive. It is appropriately energized by a power supply 28a, and "driven" by a two-phase oscillator 29, the respective phases of which are connected to the main deflector plates, such as 3 and 4 of Fig. 1. The frequency of oscillator 29 may range between 20 and 100 cycles per second. The signal output from tube 28 is derived from the ring 12 via its output connection 14, between which and ground is connected an integrating condenser 30 shunted by a resistor 31. The signal voltage drop thus generated across this condenser and resistor is fed to the input of a radio transmitter or any other suitable means for transmitting information in frequency ranges of about 20 to 5000 cycles per second, such for example, as a carrier wave radio transmitter or direct wires to the receiving station. The shape of the output signals across the resistor 31 is shown in Fig. 6. Each pulse 33 represents the magnitude of the output potential from one of the transducers 18 of Fig. 2. There is in addition to these pulses, one pulse 34 having greater amplitude than the pulses 33. This pulse is used for synchronizing the rotation of the cathode ray beam at the transmitting end with the correspondingly rotating cathode ray beam of the cathode instrument at the receiving end as will be described. Referring to Fig. 2, the pulse 34 is generated by the D.C. voltage source 35, having its negative terminal grounded as shown and its positive terminal connected directly as shown to one of the auxiliary deflector plates 7. The deflection of the electronic beam for providing the pulse is shown at 35a of Fig. 3, as discussed more fully below.

Reverting now to Fig. 5, the cathode ray tube used for reproduction of signals is shown at 36. All auxiliary deflector plates 37 of this tube are connected in multiple to the output of a radio receiver 38, or any equivalent receiver. This tube is energized from a power pack 39, and the main deflector plates 40 from a two-phase source 41. The cathode ray beam of tube 36 is circularly rotated at the same angular velocity and in synchronism with that of the transmitter tube 1, the synchronization of these rotating beams at the transmitting and receiving ends being accomplished in the following manner. As explained above, at the transmitting station one of the deflector plates 7 of the cathode ray tube is not connected to the high frequency oscillator 23, but is connected to the source of D.C. voltage 35, which is of sufficient magnitude to assure that while the cathode beam passes over the deflector plate connected thereto, the beam is continuously impinged on the metal ring 12. In this way a maximum amount of secondary electrons are emitted. This emission may be further increased by covering the corresponding segment of the ring 12 with material which emits more secondary electrons than aluminum, the latter being the preferred material for ring 12. This segment is shown at 12a of Fig. 4. Such emitting materials are well known in the electronic industry. It is understood, of course, that the segment 12a must be mounted on the ring 12 in alignment with the deflector plates 7 to which the voltage source 35 is connected. The pulse 34, Fig. 6, thus generated is the synchronizing pulse for synchronizing the receiving tube with the transmitting tube in the manner which will now be explained.

In the cathode ray tube 36 at the receiving station, there is mounted adjacent the inner surface of the screen and at the outer periphery thereof, a short metal segment 42, of aluminum or equivalent metal, which is disposed in alignment with one of the auxiliary deflector plates 37 of this tube, which corresponds in position to that of the auxiliary deflector plate 7 in the transmitting tube to which the battery 35 is connected. The amplitude of the pulses is so adjusted that only the synchronizing pulse in the transmitting station can deflect the beam of the receiving tube 36 sufficiently to impinge the segment 42 thereof. Under normal operation, only half of the pulse width will cover the segment 42. The resulting secondary emission from segment 42 creates a pulse across a resistor 43, connected between segment 42 and ground as shown. Resistor 43 is connected across the input of an A.C. amplifier 44 for amplifying the pulse thus generated, which upon amplification is rectified and integrated in the block 45, resulting in a D.C. control voltage, the value of which is dependent on how much of the synchronizing pulse covers the segment 42. Battery 62 blocks off the low amplitude pulses permitting only the synchronizing pulse to charge condenser 62a. It is possible, of course, to integrate the pulses from segment 42 before amplification and then the D.C. potential can be amplified resulting in a varying D.C. potential for control as before.

This varying D.C. potential from either of the above is applied to the control grid of a vacuum tube, such as a pentode 46. In the plate circuit of the pentode there is a coil 47 in series with a choke coil 48. The magnetic field of coil 47 is made to vary the permeability of a magnetic core 49, which is also the core for the low frequency oscillator coil 50 of the low frequency oscillator 41.

Frequency control of the low frequency oscillator 41 is thus accomplished by the synchronizing pulse effecting through proper amplification, the magnetic permeability of the oscillator coil core 49, in such manner that when more of that pulse covers segment 42 in the receiving cathode ray tube 36, the magnetic saturation of the oscillator coil core 49 is increased, thereby to reduce the inductance of the oscillator coil 50. This tends to raise the frequency of the oscillator 41, and the increased frequency moves the synchronizing pulse slightly off the segment 42, until equilibrium is established.

The complete oscillogram displayed on the screen 51 of the cathode ray tube 36 at the receiving end, is shown at 52 of Fig. 7, in which the synchronizing pulse is shown at 53, in relation to the synchronizing segment 42. It will be observed from Fig. 7 that the screen 51 is provided with angularly spaced, radially extending measuring scales, as at 54, these scales being disposed in alignment with the pulses impressed on the oscillogram trace by the various auxiliary deflector plates, respectively, as the electronic beam sweeps past them.

In the operation of tube 36, the zero position of the beam is of course near the center of the tube and the movement of the beam as it sweeps past the auxiliary deflector plates 37 is radially outward along the graduated scales 54. In a tube having a screen 12" in diameter, the diameter of the inner blank circle 56, Fig. 7, is about 2", and each scale 54 may have a length of about 5". This compares well with the scale length of a good 4½" instrument using a d'Arsonval movement. The zero adjustment is made by adjusting the voltage of the battery 57, the negative terminal of which is grounded as shown, while the positive terminal is connected over the leads 58, 59, to the metal cone 60 of the cathode ray tube 36. This adjustment is made with the receiver 38 turned off and in such manner that the oscillogram traced by the electronic beam on the screen 51 of tube 36 is about 2" in diameter. The correct amplitude of deflection of the electronic beam of tube 36 with the receiver 38 operating to receive signals from the transmitting station, is initially determined by a standard amplitude of deflection obtained by observing the reading of a fixed D.C. potential applied by battery 18a, Fig. 2, grounded at the negative terminal as shown and having its positive terminal connected to one of the auxiliary deflection plates 7 of the tube 28 at the transmitting end. The gain control 59a of the receiver 38 is so adjusted that the battery 18a deflects the electron beam radially outward the predetermined amount on the voltage scale of the tube screen 51 which measures the pulse for the deflector plate 7 to which the battery 18a is connected. After the zero adjustment and this adjustment are made, all other readings will be correct.

If a radio system is used for radio transmission, as shown in Fig. 5, the automatic volume control must be very effective in the receiver, so that the readings do not vary too frequently, requiring manual adjustment of the gain control 59a. A frequency modulated system or direct wire system is much to be preferred, for this reason, to an amplitude modulated radio system.

In a frequency band of 30 to 5000 cycles, as many as 40 telemetering channels may be used. If the shape of the indicating line at the receiving end may be curved, the frequency range can be reduced to 30 to 2500 cycles. However, such reduction of the bandwidth will tend to reduce the accuracy of readings. Narrower bandwidths, of course, may be used with fewer than 40 telemetering channels.

While the invention may be used in any application where telemetering is required, it is especially useful for testing airplanes where reading on the transmitting end inside the plane are necessary as well as on the remote end. In guided missiles, its main advantage is the comparatively large number of different phenomena which can be telemetered with simple equipment. In case of a defect in the telemetering equipment, there is an immediate indication by virtue of the fact that the standard reading as well as the amplitude and position of the synchronizing pulse will show deviation from normal.

If an extremely high degree of reliability is required, two similar CR tube systems may be installed, as shown in Fig. 7, inasmuch as both the transmitting and receiving equipments consist mainly of only one special CR tube in addition to the radio equipment. Such radio equipment would have to be used anyway with any telemetering device in airplanes or guided missiles. For increased ruggedness the envelope of the CR tubes may be made of metal with all connections coming through Pyrex "feedthroughs" in similar manner as some metal tubes are made conventionally.

Referring to Fig. 8, when two similar CR pick-up tubes are used for insuring reliability, I prefer to employ an automatic switch 60 to switch on the outputs of the transmitting CR tubes (as they appear across condenser 30) alternately, such as for one second, equipment A and for another second, equipment B. If operating normally, the signals sent out will be almost the same as if only one CR tube were used and at the receiving equipment no disturbance will be observed. There will be a faintly noticeable break every second. This is good as it indicates that the switch is operating. If one unit becomes defective, this will be so indicated at the receiving end by either a complete lack of signal, or as stated above. Wrong readings, if any, can be disregarded. If one of the low frequency oscillators is running away at the transmitting end, the synchronizing pulse will not reach segment 42, Fig. 5 (except for a very short time), and so it will be lower than usual. This lower amplitude signal can be eliminated at the receiving end by a conventional amplitude separator.

The same process of using two CR tubes may also be used on the receiving end, as at X and Y of Fig. 8, but it is preferable to have the switching done manually and only if some defect is indicated in the telemetering equipment.

It will be understood from Fig. 8, that blocks A and B represents the two completely separate CR tube transmitting equipments switched automatically by switch 60. Their outputs are transmitted by a common radio equipment 62. On the receiving end there may or may not be duplicate CR tube receiving equipments. If duplicate equipments such as X and Y are used, they require a switch 61 to operate similarly to switch 60, but as above stated preferably manually.

In the foregoing specification I have explained the principles of my invention and the best mode in which I have contemplated applying those principles, so as to distinguish my invention from other inventions; and I have particularly pointed out and distinctly claimed herein the part, improvement, or combination which I claim as my invention or discovery.

While I have shown and described certain preferred embodiments of my invention, it will be understood that modifications and changes may be made without departing from the spirit and scope thereof, as will be clear to those skilled in the art.

This application is a continuation-in-part of my applications Serial No. 316,735, dated October 24, 1952; and Serial No. 276,211, dated March 12, 1952.

What is claimed is:

1. A device for successively and repetitively indicating the magnitude of a plurality of potentials subject to variation, comprising: a cathode ray tube including a screen, an electron gun for directing an electron beam onto the screen, two sets of main deflection plates arranged when energized from a two-phase source to direct said beam in a circular trace onto said screen, a plurality of auxiliary beam deflecting plates mounted within said tube intermediate said first named plates and said screen, said auxiliary plates being disposed in spaced relation about the axis of said tube, means for connecting said plurality of potentials to said auxiliary plates, respectively, a metal segment mounted within said tube adjacent the periphery of said screen, in alignment with one of said auxiliary plates and adapted to produce secondary emission when impinged by said beam, said tube having a conductive inner coating for collecting said secondary emission, and connections extending from said coating and segment, respectively, to the exterior of said tube, and the screen of said tube being provided with angularly spaced, radially extending measuring scales disposed in alignment with said auxiliary plates, respectively.

2. A device for successively and repetitively indicating the magnitude of a plurality of potentials subject to variation, comprising: a cathode ray tube including a screen, an electron gun for directing an electron beam onto the screen, two sets of main deflection plates arranged when energized from a two-phase source to direct said beam in a circular trace onto said screen, a plurality of auxiliary beam deflecting plates mounted within said tube intermediate said first named plates and said screen, said auxiliary plates being disposed in spaced relation about the axis of said tube, means for successively connecting said plurality of potentials to said auxiliary plates, respectively, a metal member mounted coaxially within said auxiliary plates and a connection therefrom to the exterior of said tube, a metal segment mounted within said tube adjacent the periphery of said screen, in alignment with one of said auxiliary plates and adapted to produce secondary emission when impinged by said beam, said tube having a conductive inner coating for collecting said secondary emission, and connections extending from said coating and segment, respectively, to the exterior of said tube, and the screen of said tube being provided with angularly spaced, radially extending measuring scales disposed in alignment with said auxiliary plates, respectively.

3. A device for successively and repetitively indicating the magnitude of a plurality of potentials subject to variation, comprising: a cathode ray tube including a screen, an electron gun for directing an electron beam onto the screen, two sets of main deflection plates arranged when energized from a two-phase alternating current source to direct said beam in a circular trace onto said screen, a plurality of auxiliary beam deflecting plates alternating with rods mounted within said tube intermediate said first named plates and the screen, said auxiliary plates and rods being circularly disposed in spaced relation coaxial with said tube, means for connecting said plurality of potentials to said auxiliary plates, respectively, and means for grounding said rods, means for connecting a high frequency source to said auxiliary plates in multiple, a metal cone mounted coaxially within said auxiliary plates and means for grounding said cone, a metal annulus mounted coaxially within said tube adjacent said screen and blocking off its outer periphery, for producing secondary emission when impinged by said beam, said tube having a conductive inner coating and means connected thereto for collecting and withdrawing said secondary emission, and means for connecting a translating device to said annulus for indicating the instantaneous magnitude of potential thereon.

4. Apparatus for successively and repetitively indicating the magnitudes of a plurality of potentials subject to variation, comprising: a cathode ray tube including a screen, an electron gun for directing an electron beam onto the screen, two sets of main deflection plates arranged when energized from a two-phase source to direct said beam in a circular trace onto said screen, a plurality of auxiliary beam deflecting plates mounted within said tube intermediate said first named plates and said screen, said auxiliary plates being circularly disposed in spaced relation coaxial with said tube and in inclined relation thereto, an axially disposed conductive conical member disposed within said circular plates in spaced relation thereto for providing with said plates an annular path of travel for said beam, means connecting said plurality of potentials to said plates, respectively, and means connecting a high frequency source to all of said auxiliary plates, a metal annulus mounted coaxially within said tube adjacent said screen and blocking off its outer periphery for producing secondary emission when impinged by said beam, said tube having a conductive inner coating for collecting said secondary emission, and a connection thereto extending to the exterior of said tube for withdrawing the same, means for applying a biasing potential to said conical member for adjusting said circular trace substantially to the inner periphery of said metal annulus in the absence of said plurality of potentials on said auxiliary plates, whereby said potentials when applied, variably deflect said beam onto said metal annulus in accordance with the instantaneous magnitudes thereof as said beam is rotatively deflected, and translating means connected to said annulus for successively responding to the magnitudes of said potentials respectively.

5. A system for repetitively evaluating and remotely indicating the magnitudes of a plurality of potentials subject to variation, comprising: transmitting and receiving stations including a carrier wave transmitter and receiver thereat, respectively, a cathode ray tube at each station, each including a screen, an electron gun for deflecting an electron beam onto the screen, main deflecting plates and a two-phase low frequency source connected thereto for deflecting said beam in a circular trace onto the screen, and a plurality of auxiliary deflecting plates disposed about the axis of said tube between said main plates and the screen, the tube at the transmitting station having an auxiliary plate connected to a synchronizing potential and additional auxiliary plates connected to said variable potential sources, respectively, and said tube having a metal annulus disposed adjacent the screen interior adjacent its periphery for producing secondary emission when impinged by the electron beam thereof, said annulus being connected to the input of said transmitter for modulating the carrier output in accordance with the potential thereon, the tube at said receiving station having its auxiliary plates connected in multiple to the output of said receiver and having mounted thereon adjacent the periphery of the screen thereof, a metal segment disposed in alignment with the auxiliary plate which receives the synchronizing pulse as the electron beam thereof sweeps beneath it, means responsive to variation in synchronizing signals produced on said segment for maintaining the two-phase source at said receiver in synchronization with that at said transmitter, and the receiving tube screen having thereon a plurality of scales in alignment with the auxiliary plates thereof, respectively, for measuring the magnitudes of said potentials in accordance with the path traced by said electron beam on the screen.

6. A system for repetitively evaluating and remotely indicating the magnitudes of a plurality of potentials subject to variation, comprising: transmitting and receiving stations including a transmitter and a receiver thereat, respectively, a cathode ray tube at each station, each including a screen, an electron gun for deflecting an electron beam onto the screen, main deflecting plates and a two-phase low frequency source connected thereto for deflecting said beam in a circular trace onto the screen, a plurality of auxiliary deflecting plates disposed about the axis of said tube between said main plates and the screen, a metal member coaxially disposed within said plates and means applying a biasing potential thereto, the tube at the transmitting station having an auxiliary plate connected to a synchronizing potential and additional auxiliary plates connected to said variable potential sources, respectively, and also connected through condensers to a high frequency source, and said tube having a metal annulus disposed adjacent the screen interior adjacent its periphery for producing secondary emission when impinged by the electron beam thereof, said annulus being connected to the input of said transmitter and to ground through a condenser and resistance in parallel for integrating the pulse signals generated in said annulus and applying the same to said transmitter, the tube at said receiving station having its auxiliary plates connected in multiple to the output of said receiver and having mounted thereon adjacent the periphery of the screen thereof, a metal segment disposed in alignment with the auxiliary plate which receives the synchronizing pulse as the electron beam thereof sweeps past it, means to the synchronizing signal intensity on said segment for maintaining the two-phase source at said receiver in synchronization with that at said transmitter, and the receiving tube screen having thereon a plurality of scales in alignment with the remaining auxiliary plates thereof, respectively, for measuring the magnitudes of the signals in the oscillogram trace corresponding to said variable potentials.

7. A system for repetitively evaluating and remotely indicating the magnitudes of a plurality of potentials subject to variation, comprising: transmitting and receiving stations including a transmitter and a receiver thereat, respectively, a cathode ray tube at each station, each including a screen, an electron gun for deflecting an electron beam onto the screen, main deflecting plates and a two-phase low frequency source connected thereto for deflecting said beam in a circular trace onto the screen, a plurality of auxiliary deflecting plates disposed about the axis of said tube between said main plates and the screen, a metal member coaxially disposed within said plates and means applying a biasing potential thereto, the tube at the transmitting station having an auxiliary plate connected to a synchronizing potential and additional auxiliary plates connected to said variable potential sources, respectively, and also connected through condensers to a high frequency source, and said tube having a metal annulus disposed adjacent the screen interior adjacent its periphery for producing secondary emission when impinged by the electron beam thereof, said annulus being connected to the input of said transmitter and to ground through a condenser and resistance in parallel for integrating the pulse signals generated in said annulus and applying the same to said transmitter, the tube at said receiving station having its auxiliary plates connected in multiple to the output of said receiver and having mounted thereon adjacent the periphery of the screen thereof, a metal segment disposed in alignment with the auxiliary plate which received the synchronizing pulse as the electron beam thereof sweeps past it, and means for maintaining the two-phase source at said receiver in synchronization with that at said transmitter comprising, a rectifier connected to said receiving tube segment, an amplifier having its input connected to said rectifier and its output connected to the primary winding of a saturable core transformer, the secondary winding of which controls the frequency of said two-phase source, and the receiving tube screen having thereon a plurality of scales in alignment with the remaining auxiliary plates thereof, respectively, for measuring the magnitudes of the signals corresponding to said variable potentials.

8. A system for repetitively evaluating and remotely indicating the magnitudes of a plurality of potentials subject to variation, comprising: transmitting and receiving stations including a transmitter and a receiver thereat, respectively, a cathode ray tube at each station, each including a screen, an electron gun for deflecting an electron beam onto the screen, main deflecting plates and a two-phase low frequency source connected thereto for deflecting said beam in a circular trace onto the screen, a plurality of auxiliary deflecting plates disposed about the axis of said tube between said main plates and the screen, a metal member coaxially disposed within said plates and means applying a biasing potential thereto, the tube at the transmitting station having an auxiliary plate connected to a synchronizing potential and additional auxiliary plates connected to said variable potential sources, respectively, and also connected through condensers to a high frequency source, and said tube having a metal annulus disposed adjacent the screen interior adjacent its periphery for producing secondary emission when impinged by the electron beam thereof, said annulus containing a segment of increased emissivity in alignment with the auxiliary plates connected to the synchronizing potential, said annulus being connected to the input of said transmitter and to ground through a condenser and resistance in parallel for integrating the pulse signals generated in said annulus and applying the same to said transmitter, the tube at said receiving station having its auxiliary plates connected in multiple to the output of said receiver and having mounted thereon adjacent the periphery of the screen thereof, a metal segment disposed in alignment with the auxiliary plate which receives the synchronizing pulse as the electron beam thereof sweeps past it, and means for maintaining the two-phase source at said receiver in synchronization with that at said transmitter comprising, a rectifier connected to said receiving tube segment, an amplifier having its input connected to said rectifier and its output connected to the primary winding of a saturable core transformer, the secondary winding of which controls the frequency of said two-phase source, and the receiving tube screen having thereon a plurality of scales in alignment with the remaining auxiliary plates thereof, respectively, for measuring the magnitudes of the signals corresponding to said variable potentials.

9. A device for successively and repetitively indicating the magnitude of a plurality of potentials subject to variation, comprising: a cathode ray tube including a screen, an electron gun for directing an electron beam onto the screen, a metal annulus mounted coaxially within said tube adjacent said screen for blocking off its outer periphery and adapted to produce secondary emission when impinged by said beam, said tube having a conductive inner coating for collecting said secondary emission, connections extending from said coating and annulus, respectively, to the exterior of said tube, two sets of main deflection plates arranged when energized from a two-phase source to direct said beam in a circular trace onto said screen, a plurality of auxiliary beam deflecting plates mounted within said tube intermediate said first named plates and said screen, said auxiliary plates being disposed in spaced relation about the axis of said tube, means for connecting said plurality of potentials to said auxiliary plates, respectively, said auxiliary plates being axially so disposed with reference to the circular trace of said beam on said screen as radially to deflect said beam onto said annulus by amounts proportional to the potentials on said plates, respectively.

10. A device for successively and repetitively indicating the magnitude of a plurality of potentials subject to variation, comprising: a cathode ray tube including a screen, an electron gun for directing an electron beam onto the screen, a metal annulus mounted coaxially within said tube adjacent said screen for blocking off its outer periphery and adapted to produce secondary emission when impinged by said beam, said tube having a conductive inner coating for collecting said secondary emission, connections extending from said coating and annulus, respectively, to the exterior of said tube, two sets of main deflection plates arranged when energized from a two-phase source to direct said beam in a circular trace onto said screen, a plurality of auxiliary beam deflecting plates mounted within said tube intermediate said first named plates and said screen, said auxiliary plates being disposed in spaced relation about the axis of said tube, a metal member mounted coaxially within said auxiliary plates and a connection therefrom to the exterior of said tube, means for connecting said plurality of potentials to said auxiliary plates, respectively, said auxiliary plates being axially so disposed with reference to the circular trace of said beam on said screen as radially to deflect said beam onto said annulus by amounts proportional to the potentials on said plates, respectively.

11. A device for successively and repetitively indicating the magnitude of a plurality of potentials subject to variation, comprising: a cathode ray tube including a screen, an electron gun for directing an electron beam onto the screen, a metal annulus mounted coaxially within said tube adjacent said screen for blocking off its outer periphery and adapted to produce secondary emission when impinged by said beam, said tube having a conductive inner coating for collecting said secondary emission, connections extending from said coating and annulus, respectively, to the exterior of said tube, two sets of main deflection plates arranged when energized from a two-phase source to direct said beam in a circular trace onto said screen, a plurality of auxiliary beam deflecting plates mounted within said tube intermediate said first named plates and said screen, said auxiliary plates being disposed in angularly spaced relation about and inclined to the axis of said tube substantially in accordance with a conical surface having its apex directed toward said main deflecting plates, a substantially conical metal member mounted coaxially within said auxiliary plates and a connection therefrom to the exterior of said tube, means for connecting said plurality of potentials to said auxiliary plates, respectively, said auxiliary plates being axially so disposed with reference to the circular trace of said beam on said screen as radially to deflect said beam onto said annulus by amounts proportional to the potentials on said plates, respectively, said annulus having a projecting segment in alignment with one of said auxiliary plates for producing a synchronizing pulse when impinged by said beam.

References Cited in the file of this patent
UNITED STATES PATENTS

| | | |
|---|---|---|
| 2,468,085 | Labin | Apr. 26, 1949 |
| 2,524,832 | Poylo | Oct. 10, 1950 |
| 2,719,248 | Josephson | Sept. 27, 1955 |